United States Patent
Carbery

[11] Patent Number: 5,475,419
[45] Date of Patent: Dec. 12, 1995

[54] APPARATUS AND METHOD FOR THREE-DIMENSIONAL VIDEO

[75] Inventor: Ronald L. Carbery, Stony Creek, N.Y.

[73] Assignee: Carbery Dimensions, Ltd., Albany, N.Y.

[21] Appl. No.: 267,344

[22] Filed: Jun. 29, 1994

[51] Int. Cl.6 ................................................. H04N 13/00
[52] U.S. Cl. .............................. 348/59; 348/51; 359/464; 359/472
[58] Field of Search .................... 348/49, 47, 59, 348/51, 55, 54; 359/462, 463, 466, 464, 472, 466, 471

[56] References Cited

U.S. PATENT DOCUMENTS

| | | | |
|---|---|---|---|
| 2,756,363 | 7/1956 | Wright | 348/59 |
| 2,889,739 | 6/1959 | Moore | 359/463 |
| 2,983,835 | 5/1961 | Frey . | |
| 3,334,179 | 8/1967 | Winnek . | |
| 3,674,339 | 7/1972 | Sayanagi | 359/462 |
| 4,214,257 | 7/1980 | Yamauchi . | |
| 4,333,707 | 6/1982 | West . | |
| 4,571,616 | 2/1986 | Haisma et al. . | |
| 4,717,949 | 1/1988 | Eichenlaub . | |
| 4,829,365 | 5/1989 | Eichenlaub . | |
| 4,959,641 | 9/1990 | Bass . | |
| 4,963,959 | 10/1990 | Drewlo . | |
| 4,987,487 | 1/1991 | Ichinose et al. . | |
| 5,083,199 | 1/1992 | Borner . | |
| 5,099,320 | 3/1992 | Allio . | |
| 5,142,357 | 8/1992 | Lipton et al. | 348/59 |
| 5,142,642 | 8/1992 | Sudo . | |
| 5,162,779 | 11/1992 | Lumelsky et al. . | |
| 5,166,778 | 11/1992 | Beamon, III . | |

OTHER PUBLICATIONS

John Free, *3–D TV*, Popular Science, Jun. 1988, 58–63, 110.

Primary Examiner—Tommy P. Chin
Assistant Examiner—A. Au
Attorney, Agent, or Firm—Kenyon & Kenyon

[57] ABSTRACT

A system for displaying a three-dimensional video image includes a dual-lensed video camera generating signals representing a subject from each of two different perspectives, with the signals generated as a series of horizontal scan lines in a left-to-right, top-to-bottom pattern. The signals from the camera are spliced to form a combined video signal consisting of an alternating series of fields representing the image from the two perspectives. The video signal is then transmitted to a receiver including a video screen equipped with a refracticular surface. The refracticular surface consists of a series of horizontally-disposed display lines alternating between left lines and right lines, with the display lines including lenticules designed to redirect light emitted from the video screen towards a respective eye of a viewer.

20 Claims, 5 Drawing Sheets

APPARATUS AND METHOD FOR THREE-DIMENSIONAL VIDEO

BACKGROUND OF THE INVENTION

The present invention relates to the field of video communications, and specifically to an apparatus and method for achieving a three-dimensional video image using a refracticular screen surface.

It has long been a desired object in the field of video communications to achieve a commercially practical three-dimensional viewing system, especially for in-home television viewing. While numerous solutions have been proposed, heretofore none have been successful in gaining widespread acceptance. Two basic problems exist with known methods of achieving three-dimensional video images. First, most systems require the viewer to use some type of extraneous device to polarize an image being viewed, such as glasses with colored lenses like those distributed for viewing 3-D films in movie theaters. A second problem is that most systems require complex manipulation of the video signal, either on the transmitting end, the receiving end, or both. With such systems, three-dimensional viewing requires a significant financial expenditure and/or significant modification of existing equipment.

In a modern television system, a television camera tube typically includes an electron gun which fires a beam of electrons toward a light-sensitive surface. To obtain an image, the electron beam scans the light-sensitive surface horizontally and vertically in a series of 525 horizontal scan lines disposed one above the other. The horizontal scan occurs at a uniform speed from left to right, with a much faster return to the left. Similarly, the vertical scan occurs at a uniform speed from top to bottom, with a much faster retrace to the top of the screen. The light-sensitive surface produces an electrical output signal when the electron beam strikes it, which is then input to a video amplifier. Since the magnitude of the voltage produced is proportional to the light intensity at that point on the light-sensitive surface, the video information signal generated by the video amplifier furnishes an electrical representation of the image viewed by the camera. Prior to being transmitted to a receiver, the video information signal is mixed with a synchronization signal that will enable the receiver to correctly reproduce the scanning pattern used by the camera to generate the signal.

At the receiver, the video information signal drives a grid for an electron gun in a picture tube, such as a cathode ray tube (CRT). The electron gun causes the CRT to display an image by varying the intensity of a beam of electrons according to the amplitude of the received video signal as the beam is focused onto a fluorescent screen at the face of the CRT. A peak in the video signal will result in a very bright spot, while a lower amplitude in the video signal will result in a darker spot. While the electron beam intensity is varied according to the amplitude of the received video signal, the electron beam is simultaneously scanned across the face of the CRT in a pattern duplicating the left-to-right, top-to-bottom motion of the beam that scanned the face of the TV camera tube. The two electron beams are synchronized using the aforementioned synchronization signal; thus, the image formed on the CRT consists of a pattern of varying-intensity light traced sequentially in the same fashion as the image processed by the television camera.

Since the image is formed sequentially, the beginning of the image must remain in view while the rest of the image is being formed so that a viewer perceives a complete picture. To this end, the fluorescent screen of the picture tube and the human eye work together by retaining the spot images on the tube long enough for the eye to see a complete image. In most television systems, this laying down of the sequential screen image happens at a rate of 30 complete, 525-line frames each second. This scan rate, however, has been found to present some problems because the viewer may sometimes notice the picture flickering due to the minute delays between the formation of one image and the next. Modern television systems therefore employ "interlaced scanning" of picture images to eliminate this phenomenon.

With interlaced scanning, a 525-line frame is treated as two interleaved fields of horizontal scan lines, wherein each field is scanned 60 times per second. That is, a field consisting of all of the odd-numbered lines in a 525-line frame are scanned in 1/60 second, followed by a second field consisting of all of the even-numbered lines. Due to the rapid rate at which the alternate fields are painted on the screen, a viewer will not perceive each field as a broken image. Moreover, the human eye is unable to detect an image flicker in the 1/60 second that elapses between painting of the top line and the bottom line of the image. By interleaving the respective odd and even fields, a complete 525-line frame is formed 30 times each second.

The three-dimensional video system of the present invention exploits the human brain's ability to perceive three-dimensional data by triangulating the images provided from the slightly-different perspectives of the left and right eyes. The human brain will inherently attempt to convert a two-dimensional subject, such as a television picture, into a three-dimensional image if given the opportunity to receive slightly different perspectives from each eye. However, two factors associated with standard television pictures prevent the brain from being successful. First and foremost, a video signal generally represents only a single perspective, as provided by a standard, single-lens video camera. Second, even if the video signal were to include two different perspectives, a standard video screen is incapable of directing the different perspectives to the appropriate eyes to enable the brain to triangulate the information.

An approach to three-dimensional video illustrating some of the problems of prior art systems is described in U.S. Pat. No. 4,963,959 to Drewlo, entitled "Three-Dimensional Cathode Ray Tube Display." Drewlo uses two modified television cameras mounted side-by-side to obtain video images from two different perspectives. Unlike conventional cameras, the electron guns of the Drewlo cameras sweep a scene in a top-to-bottom, left-to-right pattern, thereby providing a vertically-oriented scan. The signals from the two cameras are then combined by a signal mixer into a composite signal before being transmitted to a receiver. At the receiver, the composite signal is split into its two constituent signals and either fed to two separate electron guns or a single electron gun which time division multiplexes the beams. In either case, the separated right and left beams are passed through a Fresnel lens attached to the inner surface of the viewing screen. The Fresnel lens includes a series of vertical grooves which define a plurality of contiguous, closely-spaced and vertically-oriented prisms which provide optical isolation in the horizontal plane, thereby directing independent video streams towards each eye. In order to align the sweep of the picture tube's electron beam with these vertical prisms, deflection circuitry associated with the neck of the cathode ray tube must be rotated so that the face of the screen is swept by the electron beam in vertical strokes, rather than horizontal strokes. As can be seen, the Drewlo approach undesirably requires a significant modification of the receiver.

SUMMARY OF THE INVENTION

The present invention provides a system and method of displaying a three-dimensional video image using a refracticular screen. Unlike prior art efforts at three-dimensional video, the present invention does not require significant modification of existing video transmitters or receivers. Furthermore, a viewer is able to perceive three-dimensional images without extraneous eyewear.

In one embodiment of the invention, a video camera includes two lenses capable of providing two views of a subject that are slightly offset from one another in a horizontal direction. As with a standard television camera, the video camera according to the present invention generates an electronic signal representing the subject by scanning the subject in a left-to-right, top-to-bottom pattern to produce fields of horizontal scan lines. Each lens provides input for a distinct series of scan lines which are combined to create a video signal consisting of a series of fields that successively alternate between the two perspectives. This video signal is then transmitted to a receiver fitted with a refracticular screen consisting of a series of alternating left and right display lines, each of which includes a number of respective left and right lenticules. The lenticules are designed to redirect light emitting from the screen surface alternately left or right of a central vertical plane of the video screen. Thus, a viewer positioned in front of the video screen will perceive images originating from the left lens of the video camera substantially in the left eye, and images originating from the right lens substantially in the right eye. The viewer's brain will then be able to triangulate the different perspectives just as if the subject were being viewed directly (as opposed to on a two-dimensional video screen), thereby giving the viewer the perception that the subject has depth. In other words, the viewer will perceive the televised image as three-dimensional.

In an alternate embodiment of the invention, video signals are generated by two distinct video cameras, each of which generates fields of horizontal scan lines. These two signals may then be spliced using electronic circuitry or computer processing into a single video signal consisting of fields of scan lines alternating between perspectives provided by the different cameras.

An embodiment of a refracticular screen according to the present invention includes a light-transmissive sheet having a substantially flat rear surface. A forward surface of the sheet is composed of a number of horizontal display lines alternating between left and right display lines. Each of the display lines includes a number of lenticules providing to the directivity of the line, with each lenticule consisting of a rectangular forward face rising from the plane of the rear surface at a predetermined angle of deflection. The forward face of a right lenticule rises towards the left side of the refracticular surface as viewed from the front, while a left lenticule rises toward the right side of the refracticular surface. The angled forward face serves to deflect light emitted from behind the refracticular surface either left or right of a central vertical axis of the video screen.

In a preferred embodiment wherein the refracticular screen is adapted for use with a color television signal, each lenticule has a forward face with a surface area approximately equal to the surface area of a single red-blue-green phosphor combination. The number of horizontal display lines included in the refracticular surface ideally corresponds to the number of lines in video frame to be displayed (typically, 525 lines).

The present invention advantageously enables a viewer to see a three-dimensional image with only limited changes to existing equipment by fully taking advantage of existing interlaced scanning technology. As such, three-dimensional viewing simply requires generating an interlaced video signal with alternating left and right views, and then providing a refracticular surface to direct these respective views to the appropriate eyes of the viewer.

Features and advantages of the three-dimensional video method and apparatus of the present invention are described below with reference to the drawing figures. Other features and advantages will be readily apparent to persons skilled in the art.

DETAILED DESCRIPTION

Figure 1:
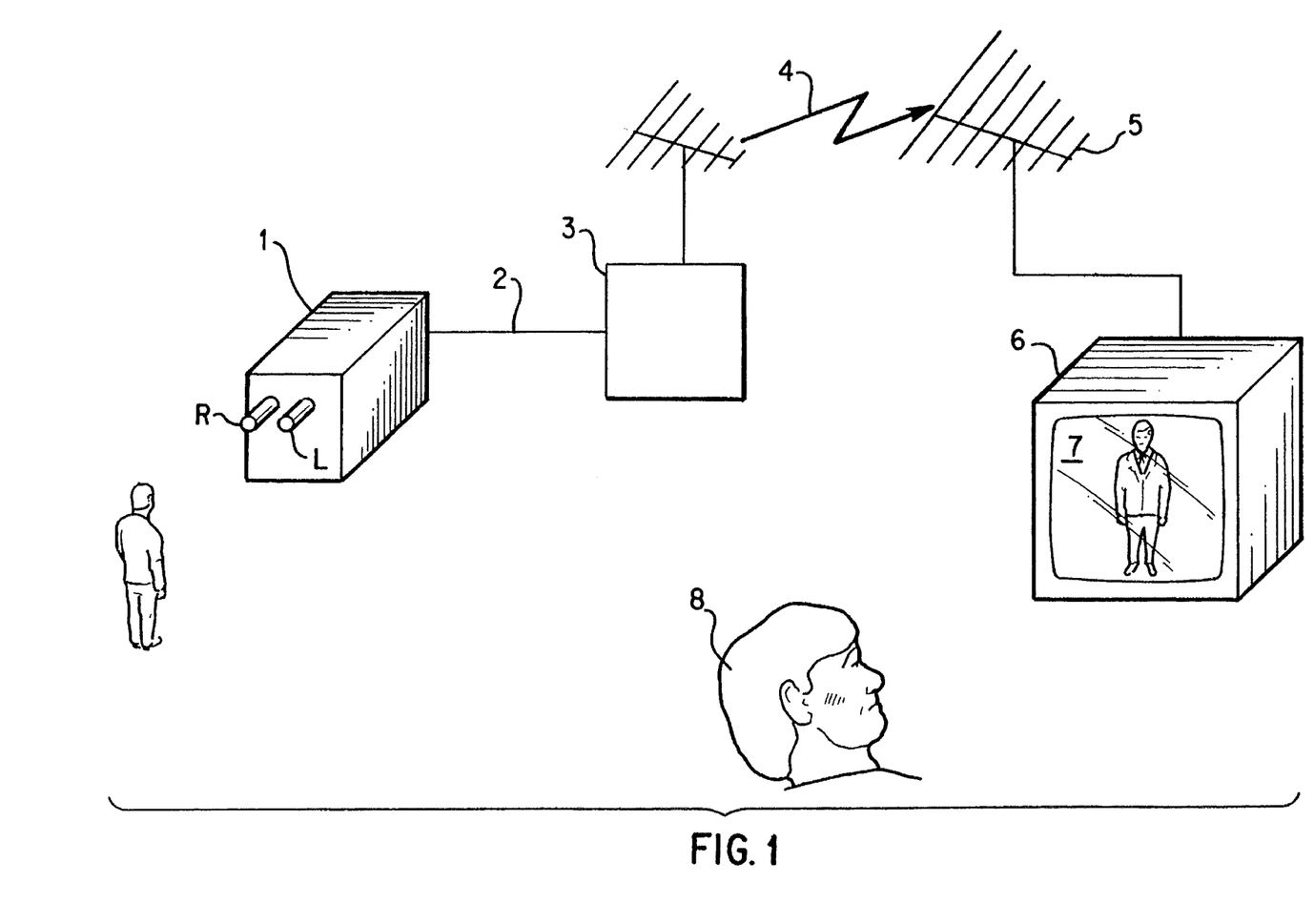
FIG. 1 is an embodiment of a three-dimensional video system according to the present invention.

Referring to FIG. 1, an embodiment of a three-dimensional video system according to the present invention includes a dual-lensed video camera 1 capable of generating a video image of a three-dimensional subject as viewed from two slightly different perspectives. As will be amplified below, the dual-lensed video camera 1 is capable of generating a video signal 2 in which alternating fields of horizontal scan lines represent a view from either the left lens or the right lens. The video signal 2 is input to a transmitter 3, which may be any standard television transmitter, such as an amplitude modulated transmitter, capable of generating an interlaced scanning signal. The transmitter 3 combines the video signal 2 with an aural signal (not shown), and then transmits a composite video signal 4. This transmission may be accomplished by any known method for transmitting video signals, including commonly-known methods involving cable reception, satellite transmission, or antenna reception. A television receiver 6 receives the video signal 4 through an antenna 5.

The television receiver 6 is substantially a standard television receiver, but includes a refracticular screen 7 as the forward face of the viewing screen. Using standard interlaced-scanning processing, the receiver displays the received video images to a viewer 8 through the refracticular screen 7. The combination of the interlaced left-right video images and the refracticular screen 7 ensures that the images from the left lens of the video camera 1 are predominantly directed to the viewer's 8 left eye, while images from the right lens are predominantly directed to the viewer's 8 right eye. As a result, the viewer 8 interprets the image as three-dimensional.

The video camera 1 shown in FIG. 1 operates substantially the same as prior art television cameras; however, instead of a single lens being used to generate a 525-line frame consisting of odd and even, single-perspective fields, the alternating fields here consist of images respectively generated from the left and right lenses. For example, the field of odd-numbered scan lines would be composed of signals from the left lens of the video camera 1, while the field of even-numbered scan lines would be generated from the right lens.

The composite left-right video signal used by the present invention to generate three-dimensional images may be produced either mechanically or electrically. In a preferred embodiment shown in FIG. 1A, the camera 1 includes two vidicon picture tubes 19 with respective photoconductive surfaces 20. Each photoconductive surface 20 includes an optical window 21, a transparent conducting signal electrode plate 22, and a photoconductive layer 23. The optical windows 21 of the respective picture tubes 19 are slightly offset from one another by a distance substantially equal to the distance between an average adult's eyes (typically 3 ½ inches). In each vidicon picture tube 19, an electron gun 24 fires a beam of electrons in a controlled pattern at the photoconductive layer 23. The controlled pattern is achieved by means of horizontal and vertical synchronization signals fed to the electron guns 24 by a synchronization generator 26. The synchronization generator 26, which may be an integral component of the video camera 1 or a separate module, also feeds the synchronization signals to a transmitter 28 to facilitate a matching scan by a video receiver.

Figure 1A:
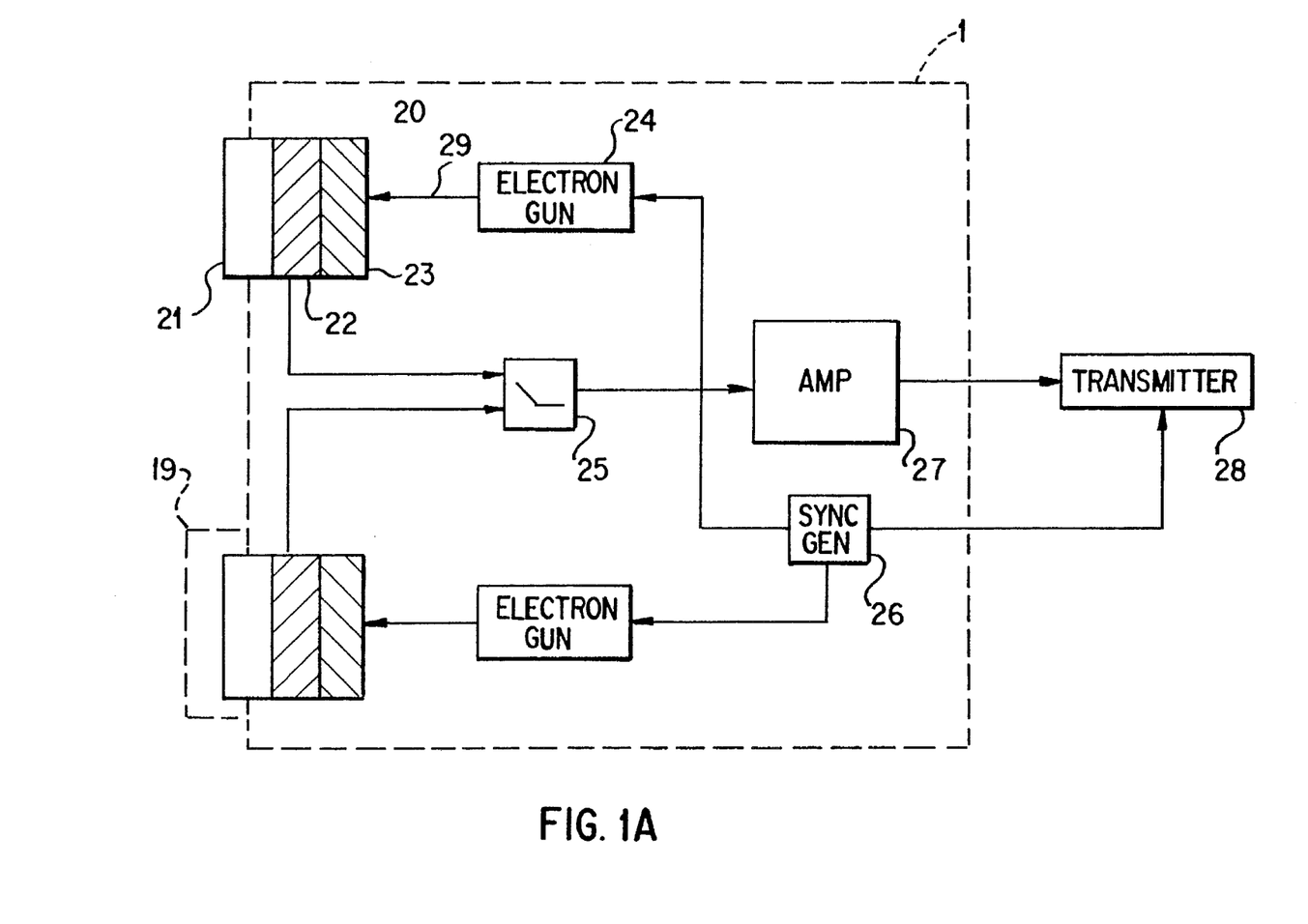
FIG. 1A is an embodiment of a dual-lens video camera according to the present invention.

The method by which each of the picture tubes of FIG. 1A separately generates a video signal is well known in the art. In essence, the photoconductive layer 23 includes a material, such as lead oxide, whose electrical conductivity varies in relation to the amount of light contacting it. The photoconductive layer 23 will initially exhibit a uniform charge in response to the electron beam 29. As light received from an image through the optical window 21 passes through the signal electrode plate 22, The conductivity of the photoconductive layer 23 varies accordingly and charges are leaked off through the photoconductive layer 23 to the signal electrode plate 22. As a result, a charge pattern remains on the photoconductive layer 23 that is greatest where little or no light fell, and least where the most light fell. Then, as the electron beam sweeps the photoconductive layer 23, it recharges positively-charged areas and there is a current flow through the photoconductive layer 23 to the signal plate 22. This current flow thus represents the video-signal information.

Unlike a standard video camera with only a single picture tube, the camera of FIG. 1A provides electrical representations of two different perspectives of an image. The electrical signals representing these two perspectives will be alternated to form a two-perspective video signal using a switch 25. The switch 25 may be a common flip-flop circuit capable of alternating the picture tube 19 from which it receives a signal using a proper bias voltage. In order to conform with existing interlaced scanning standards, the flip-flop circuit switches at a rate of sixty times per second, thereby enabling a receiver to fully reconstitute the subject with every other line of the picture having originated from an alternate lens. An advantage of this embodiment is that the video camera requires minimal duplicate circuitry to generate a dual image. The video signal of alternating left and right fields may be processed just as if it contained only a single perspective. Thus, all circuitry downstream of the electron gun can remain substantially unchanged.

In an alternate embodiment of the invention, a single camera includes two lenses and a shuttering mechanism that alternately uncovers the left and right lenses. In yet another embodiment, video signals generated from two separate, closely-spaced cameras may be input to a microprocessor which splices the signals into a composite video signal containing alternating left and right images. Each of these approaches is well within the talents of one of ordinary skill in the art. The only requirement of the present invention is that the video camera produce an interlaced scanning video signal containing fields which alternately represent right and left views of an image.

Figure 2:
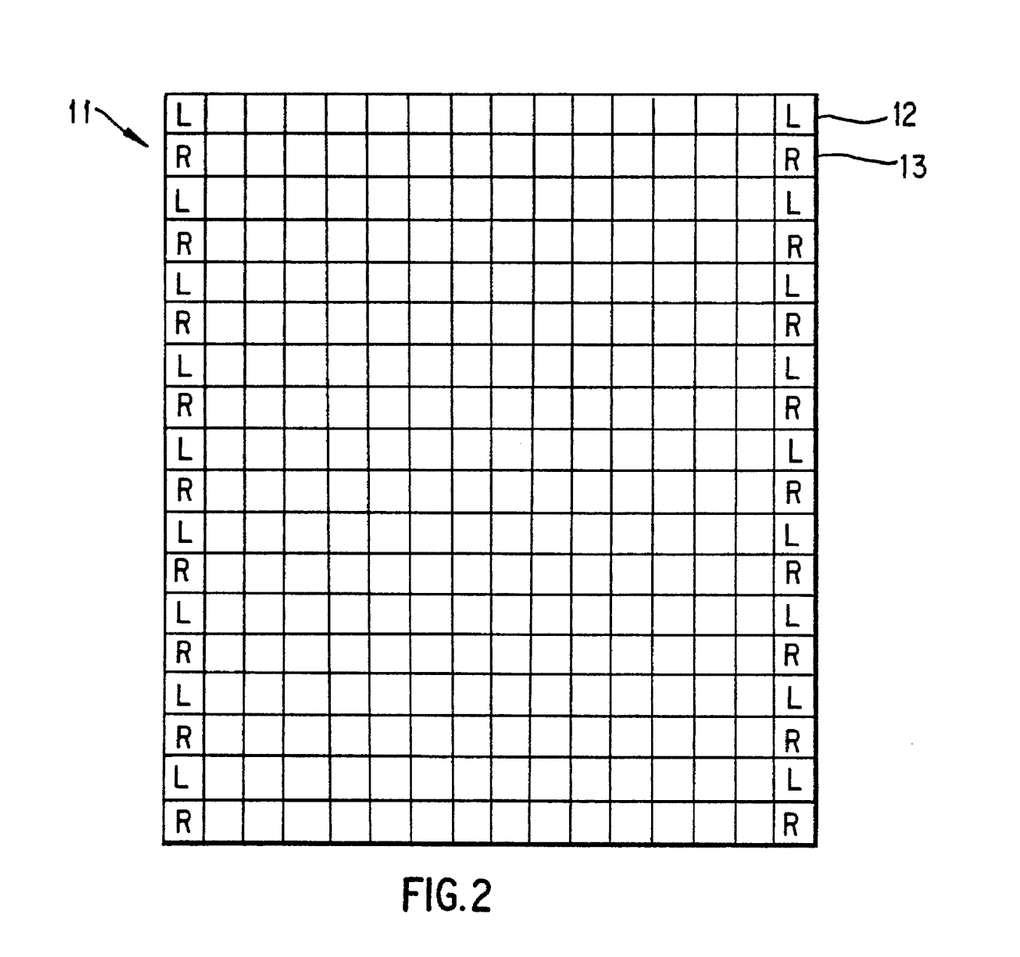
FIG. 2 is a front view of an embodiment of a refracticular screen.

FIG. 2 shows a front view of an embodiment of a refracticular screen 11 for converting a standard television receiver into a three-dimensional viewing screen. The refracticular screen 11 preferably is formed as an integral forward surface of a glass video screen using known manufacturing techniques, such as injection-molding. Alternately, the refracticular screen 11 may be a separately-manufactured glass or transparent plastic sheet capable of being firmly affixed to an existing video screen, for example, using a clear adhesive or a mounting frame. This approach would permit existing television receivers to be upgraded for three-dimensional viewing.

The refracticular screen 7 is divided into 525 horizontal display lines, matching the number of lines in a single frame of a standard interlaced-scanning television signal. The display lines of the refracticular screen 7 are alternately left lines 12 and right lines 13, with the direction of the display lines determined according to the configuration shown in FIG. 3.

Figure 3:
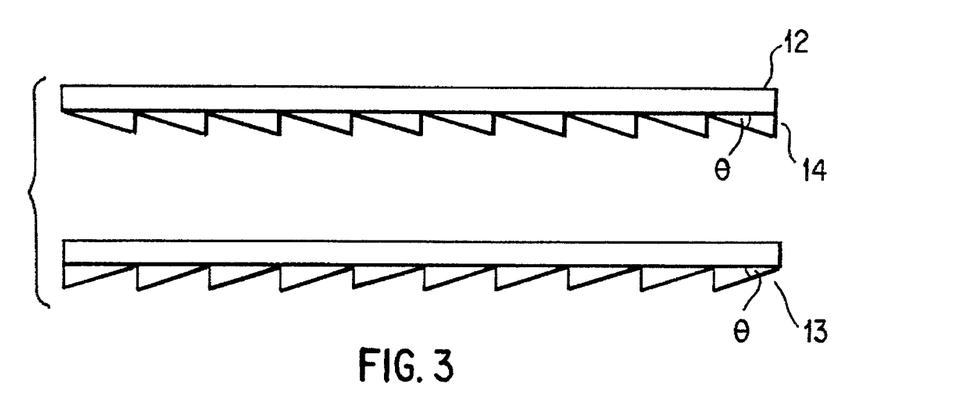
FIG. 3 is an isolated top-down view of a left and right display line of a refracticular screen.

FIG. 3 provides a top view of both a left display line 12 and a right display line 13. An individual left display line 12 includes a plurality of lenticules 14, each of which is formed as a wedge-shaped projection extending outwardly from the forward plane of the refracticular screen. The angle of deflection θ at which the front face of the lenticule rises from the screen surface is a function of the viewing distance for which the screen is to be optimized.

Figure 4:
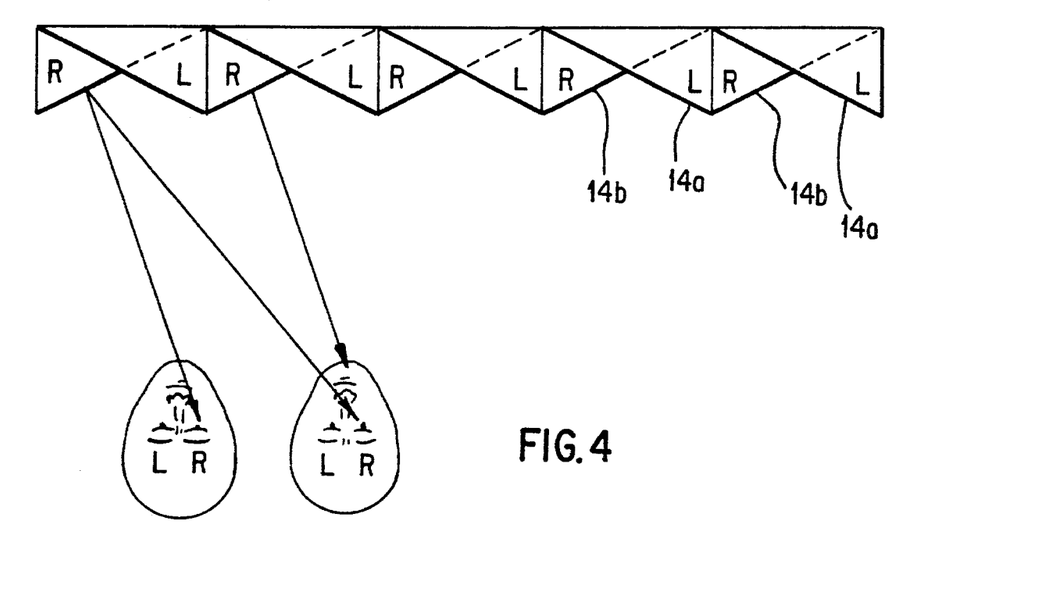
FIG. 4 is a top-down view of a refracticular screen illustrating how a right-perspective image is directed toward the right eye of a viewer.

Referring to FIG. 4, the refracticular screen may be thought of as a stack of alternating left and right display lines, composed respectively of left and right lenticules 14a, 14b. This configuration causes light originating from a phosphorous surface and passing through the refracticular screen surface to be predominantly redirected toward one or the other of a viewer's eyes. That is, light passing through a right display line will be redirected by the right lenticules 13 predominantly towards the right eye of a viewer, and light passing through a left display line will be redirected towards the left eye of the viewer.

Figure 5:
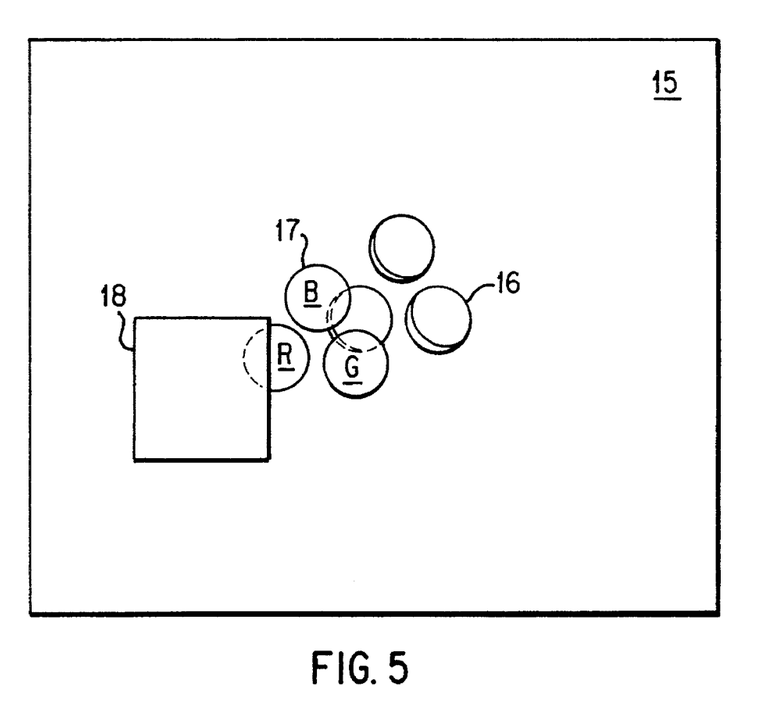
FIG. 5 shows the relationship between a lenticule of a refracticular screen, a pixel of a video screen, and a shadow mask.

FIG. 5 shows an embodiment of the present invention adapted for use with a standard color television receiver. As is known in the art, a color television generates color by varying the intensity of an electron beam fired by each of three electron guns at a plurality of respective red, blue and green phosphors (R, B, G). A single red-blue-green phosphor combination is known as a pixel 17. Each of the electron guns is responsible for illuminating a different color phosphor; that is, there is a red gun, a blue gun and a green gun. A shadow mask 15 including holes 16 is typically positioned behind the screen of pixels to assist in concentrating the electron beams on only the color phosphor associated with the particular gun. In this embodiment, the forward face of each lenticule 18 has a surface area equal to the surface area of one pixel 17 of red-blue-green phosphors, and is aligned so that the pixel is directly between the lenticule 18 and the holes 16 in the shadow mask associated with that pixel.

The preferred size of each lenticule 18 may vary according to characteristics of the picture tube being adapted for three-dimensional viewing. In a nominal 25-inch picture tube, for example, each lenticule would be 1/13 inch in height and would run 1/16 inch along the front plane of the screen surface to cover the surface area of the pixel 17. Notwithstanding this ideal configuration, for ease of manufacture a more reasonable size for the lenticules might be two pixels in width, or approximately 1/8 inch horizontally.

Figure 6:
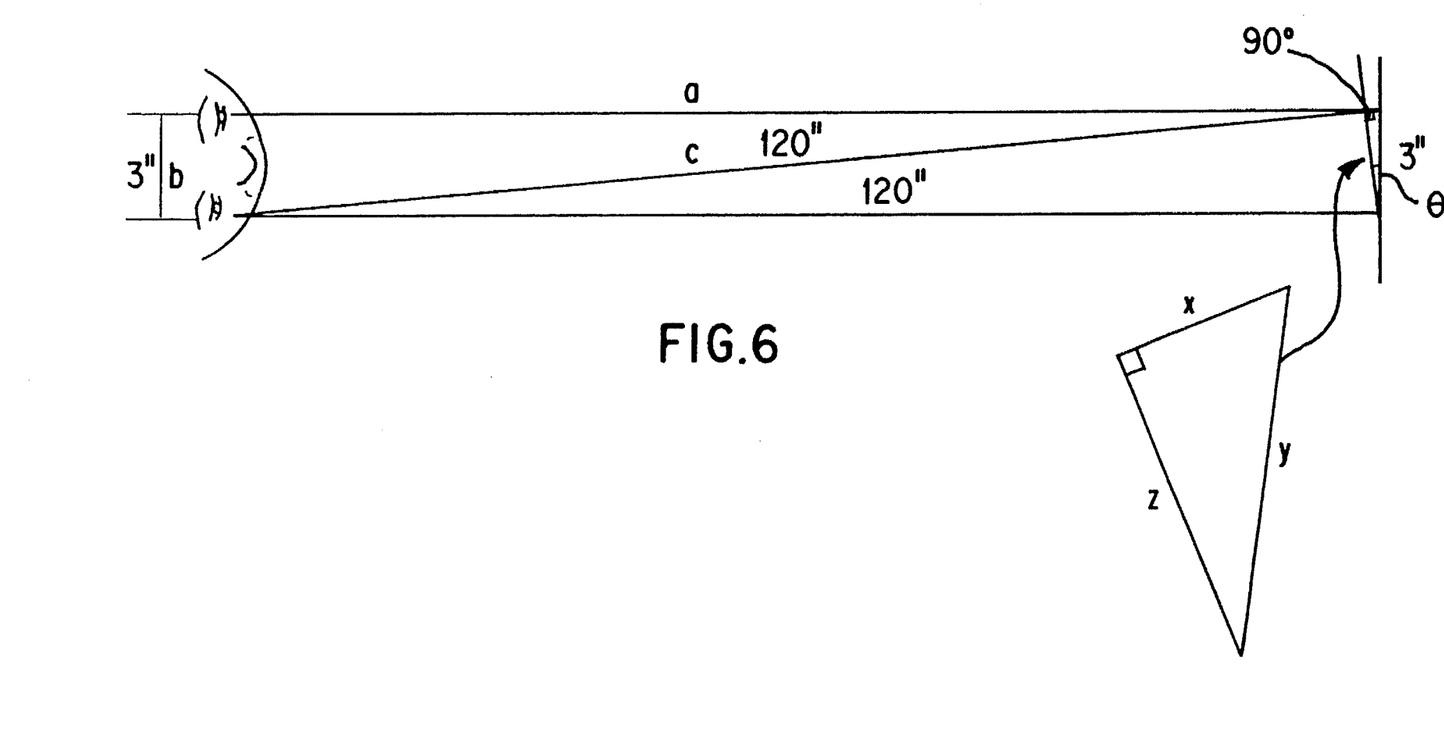
FIG. 6 describes the geometric relationship between viewer position and configuration of the refracticular screen.

The angle of deflection θ for each lenticule, defined as the angle at which the forward face of the lenticule rises from a flat normal surface of a picture screen, will generally be no more than 2°, based on an optimal viewing distance of 12–15 feet. The actual angle may vary according to characteristics of the television screen being adapted and the desired viewing distance for which the refracticular screen is to be optimized. Referring to FIG. 6, for example, the angle of deflection θ for a right lenticule (that is, a lenticule directing an image to the right eye of a viewer) may be determined using basic trigonometric principles. Assume a viewer is optimally positioned such that the viewer's right eye is 120" from the face of the lenticule. Assume further that the viewer's left and right eyes are 3" apart. This relationship may be described by a right triangle abc, where one leg b is 3" and the hypotenuse c is 120". The length of leg a may thus be computed as:

$$a = \sqrt{c^2 - b^2}$$

Substituting values, the leg a may be shown to equal 119.96249 inches. If a second right triangle xyz is drawn with its leg z perpendicular to leg c of the first triangle, it can be shown that the length of leg x is equal to c−a=120−119.96249=0.03751 inches Since the length of leg y is equal to 3", the angle of deflection θ may be computed as:

$$\sin\theta = \frac{x}{y} = \frac{0.03751}{3}$$

Solving this equation, it can be shown that e is approximately equal to 1°. Accordingly, a refracticular screen optimized for viewing at a distance of 10 feet may have left and right lenticules with a 1° angle of deflection.

A principle advantage of the present invention is its adaptability to existing television systems, making it a highly attractive solution to the problem of providing three-dimensional television viewing for in-home use. As noted above, generation of the required television signal requires only minimal changes to existing equipment to produce a signal having alternating right and left images. The television receiver would decode this signal as it currently decodes a standard, single-perspective signal. No new circuitry is required because the content of the individual fields comprising a picture frame is substantially transparent to the receiver electronics. Instead of alternating fields of odd and even lines of a single perspective frame, the television simply receives alternating fields of lines taken from left and right perspectives. Moreover, the refracticular screen will have little effect on the quality of a standard, single-perspective picture signal because of the relatively minor angular offset of the lenticules.

An existing television receiver fitted with a refracticular screen can produce a three-dimensional image by processing the received video signal just as it would a standard video signal. The only difference is that the alternate fields displayed by the receiver represent two different perspectives, as opposed to only a single view.

The quality of the three-dimensional effect may be optimized by a viewer using the vertical positioning control typically included with a television receivers. This control, which is designed to vertically shift the picture up or down, can be used to fine-tune the position of the picture until the best three-dimensional image results (i.e., the viewer is ensuring the right and left perspective scan lines are projected through right and left lenticules, respectively).

As will be apparent to persons skilled in the art, the three-dimensional video system of the present invention is not limited to application in television systems. The refracticular screen technology is equally applicable to other common video applications such as computers, medical diagnostic systems and arcade-style video games. For computer video terminals and other applications that currently support interlaced scanning, no circuitry changes would be required. Once a refracticular screen is provided, the problem boils down to providing a dual-perspective video input. For example, three-dimensional computer graphic images using the refracticular screen technology of the present invention would merely require that the software used to generate video images be modified to provide dual-perspective video images.

While the present invention has been described with reference to specific embodiments, it will be apparent to those skilled in the art that many modifications and variations are possible. Accordingly, the present invention embraces all alternatives, modifications and variations that fall within the spirit and scope of the appended claims, as well as all equivalents thereof.

What is claimed:

1. A video system for displaying a three-dimensional image to a viewer, comprising:

(a) a video camera capable of generating an electronic representation of a three-dimensional subject, said electronic representation comprising a first and second set of horizontal scan lines, said first set of horizontal scan lines representing an image of said subject as viewed from a first perspective and said second set of horizontal scan lines representing an image of said subject as viewed from a second perspective;

(b) a transmitter coupled to said video camera, said transmitter generating a video signal from said electronic representation, said video signal comprising an alternating series of said first and second sets of horizontal scan lines; and (c) a receiver capable of detecting said video signal generated by said transmitter, said receiver including a refracticular screen having a series of alternating left and right horizontal display lines, wherein each of said left and right display lines comprises a plurality of lenticules directing light emanating from behind said refracticular screen respectively left and right of a central vertical axis of said refracticular screen.

2. The video system of claim 1, wherein each of said plurality of lenticules comprises a wedge-shaped projection extending outward from said refracticular screen at a predetermined angle of deflection.

3. The video system of claim 2, wherein said refracticular screen further comprises a total number of horizontal display lines equal to a total number of horizontal scan lines used to represent a frame of said subject in said video signal.

4. The video system of claim 2, wherein said video camera includes a left lens, a right lens, and a switching mechanism capable of alternating from which of said left and right lenses a horizontal scan line is retrieved for generating said electronic representation of said subject.

5. A video system for enabling a viewer of a video display to perceive a displayed image as three-dimensional, said video system comprising:

(a) a video camera generating a first signal representing a three-dimensional subject as viewed from a first perspective and a second signal representing the three-dimensional subject as viewed from a second perspective, said second perspective being offset from said first perspective;

(b) a transmitter coupled to said video camera for broadcasting a dual-perspective video signal, said dual-perspective video signal representing said three-dimensional subject as viewed from both of said first and second perspectives and comprising a series of said first and second signals from said video camera;

(c) a receiver capable of converting said dual-perspective video signal into a visual depiction of the three-dimensional subject, said receiver including a video screen with a refracticular surface disposed in a forward face thereof, said refracticular surface comprising a series of alternating left and right horizontal display lines, each of said left and right display lines comprising a plurality of lenticules directing light emanating from said video screen respectively left and right of a central vertical axis of said video screen.

6. The video system of claim 5, wherein said video camera uses a left-to-right, top-to-bottom scan pattern to generate said first and second signals representing the three-dimensional subject as a set of horizontal scan lines.

7. The video system of claim 5, wherein said dual-perspective video signal comprises 525-line interlaced scanning video signal.

8. The video system of claim 6, wherein each of said plurality of lenticules comprises a wedge-shaped projection extending outward from said refracticular surface at a predetermined angle of deflection.

9. The video system of claim 8, wherein said refracticular surface further comprises a total number of horizontal display lines equal to a total number of horizontal scan lines included in a frame of dual-perspective video signal.

10. A refracticular screen enabling a viewer to perceive a displayed video image as three-dimensional, said displayed image represented by a video signal comprising a series of left scan lines and a series of right scan lines, each of said series of scan lines providing a view of said image from a perspective offset from that of the other series, the refracticular screen comprising a sheet of light-transmissive material formed as a series of horizontally disposed display lines, each of said display lines alternately comprising one of a plurality of left lenticules and a plurality of right lenticules, wherein said display lines redirect light emanating from a point behind said refracticular screen to the left and right respectively of a central vertical axis of said refracticular screen.

11. The refracticular screen of claim 10, wherein each of said plurality of left and right lenticules comprise a wedge-shaped projection with a forward face rising from a plane of said refracticular screen at a predetermined angle of deflection.

12. The refracticular screen of claim 11, wherein said forward face of each of said plurality of left and right lenticules has a surface area approximately equal to a surface area of a pixel of said refracticular screen.

13. The refracticular screen of claim 11 optimized for use with a nominal 25-inch television receiver, wherein each of said plurality of left and right lenticules comprises a rectangular forward face having a length approximately equal to $\frac{1}{16}$ inch and a width approximately equal to $\frac{1}{13}$ inch.

14. A method for enabling a viewer of a video display to perceive an image as three-dimensional, said method comprising:

(a) generating an electronic representation of a subject as viewed from a first perspective;

(b) generating an electronic representation of the subject as viewed from a second perspective offset from said first perspective;

(c) combining said electronic representations into a video signal comprising a series of horizontal scan lines; and (d) converting said video signal into a visual image displayed on a video screen, said video screen comprising a light-emitting surface and a refracticular surface disposed between said light-emitting surface and the viewer, said refracticular surface comprising a plurality of alternating left and right horizontal display lines for redirecting light traveling through said refracticular surface to the left and right respectively of a central vertical axis of said refracticular surface, said visual image being displayed on said video screen by tracing said series of horizontal scan lines on said light-emitting surface such that each of said scan lines is aligned with a display line corresponding to said perspective associated with that scan line.

15. The method of claim 14, wherein said steps of generating an electronic representation of a subject comprises scanning said subject in a left-to-right, top-to-bottom pattern from each of said first and second perspectives, thereby by producing respective sets of horizontal scan lines.

16. The method of claim 15, wherein said steps of generating an electronic representation of a subject from said first and second perspectives is performed by a single video camera including a left lens, a right lens, and a switching mechanism successively alternating from which of said left and right lenses input for said video signal is received.

17. The method of claim 15, wherein each of said first and second perspectives of the subject are generated by a respective electron gun.

18. The method of claim 17, wherein said step of converting said video signal into a visual image further comprises redirecting light corresponding to said first perspective towards a first eye of a viewer and redirecting light corresponding to said second perspective towards a second eye of said viewer.

19. The method of claim 18, wherein each of said display lines of said refracticular surface comprises a forward face rising from a plane of said refracticular surface at a predetermined angle of deflection.

20. The method of claim 19, wherein said predetermined angle of deflection is approximately 1° to 2°.

* * * * *

UNITED STATES PATENT AND TRADEMARK OFFICE
CERTIFICATE OF CORRECTION

PATENT NO. : 5,475,419
DATED : 12 December 1995
INVENTOR(S) : Ronald L. CARBERY

It is certified that error appears in the above-indentified patent and that said Letters Patent is hereby corrected as shown below:

| Column | Line | |
|--------|------|---|
| 10 | 40 | Change "prises" to --prise--. |
| 10 | 42 | Delete "by". |

Signed and Sealed this

Sixteenth Day of April, 1996

Attest:

BRUCE LEHMAN

Attesting Officer

Commissioner of Patents and Trademarks